United States Patent
Gady et al.

(10) Patent No.: US 9,133,749 B2
(45) Date of Patent: Sep. 15, 2015

(54) AMMONIA STORAGE SET-POINT CONTROL FOR SELECTIVE CATALYTIC REDUCTION APPLICATIONS

(76) Inventors: Kevin Andrew Gady, Ypsilanti, MI (US); Anupam Gangopadhyay, Mrc Nagar (IN)

(*) Notice: Subject to any disclaimer, the term of this patent is extended or adjusted under 35 U.S.C. 154(b) by 1140 days.

(21) Appl. No.: 12/579,737

(22) Filed: Oct. 15, 2009

(65) Prior Publication Data

US 2011/0005209 A1   Jan. 13, 2011

Related U.S. Application Data

(60) Provisional application No. 61/224,653, filed on Jul. 10, 2009.

(51) Int. Cl.
| | |
|---|---|
| *F01N 3/00* | (2006.01) |
| *F01N 3/20* | (2006.01) |
| *F01N 3/10* | (2006.01) |
| *F01N 13/00* | (2010.01) |

(52) U.S. Cl.
CPC ............ *F01N 3/208* (2013.01); *F01N 3/103* (2013.01); *F01N 3/105* (2013.01); *F01N 13/009* (2014.06); *F01N 2560/026* (2013.01); *F01N 2560/06* (2013.01); *F01N 2560/14* (2013.01); *F01N 2610/02* (2013.01); *F01N 2900/1402* (2013.01); *F01N 2900/1616* (2013.01); *F01N 2900/1622* (2013.01); *Y02T 10/24* (2013.01)

(58) Field of Classification Search
CPC ............ F01N 3/208; F01N 2560/06; F01N 2560/026; F01N 2610/02; F01N 2900/1402; F01N 2900/1616; F01N 2900/1622; Y02T 10/24

USPC ................ 60/274, 286, 295, 301, 303
See application file for complete search history.

(56) References Cited

U.S. PATENT DOCUMENTS

| | | | | |
|---|---|---|---|---|
| 5,628,186 | A * | 5/1997 | Schmelz | 60/286 |
| 6,125,629 | A * | 10/2000 | Patchett | 60/286 |
| 6,269,633 | B1 * | 8/2001 | van Nieuwstadt et al. | 60/277 |
| 6,415,602 | B1 * | 7/2002 | Patchett et al. | 60/286 |
| 6,581,374 | B2 * | 6/2003 | Patchett et al. | 60/286 |
| 6,981,368 | B2 * | 1/2006 | van Nieuwstadt et al. | 60/277 |
| 7,559,194 | B2 | 7/2009 | Westerberg | |
| 7,736,595 | B2 | 6/2010 | Gady et al. | |
| 7,858,060 | B2 | 12/2010 | Gady et al. | |
| 8,061,126 | B2 | 11/2011 | Gady et al. | |
| 8,096,110 | B2 * | 1/2012 | Solbrig | 60/286 |
| 8,316,634 | B2 * | 11/2012 | Jasinkiewicz | 60/286 |
| 2009/0185954 | A1 | 7/2009 | Qi et al. | |
| 2009/0272104 | A1 | 11/2009 | Garimella et al. | |

* cited by examiner

*Primary Examiner* — Thomas Denion
*Assistant Examiner* — Diem Tran (57) ABSTRACT

A system includes an injector control module and an SCR optimization module. The injector control module controls an amount of ammonia ($NH_3$) stored in a selective catalytic reduction (SCR) catalyst to maintain a first storage level. The SCR optimization module determines whether the first storage level maximizes a conversion efficiency of the SCR catalyst at a first temperature and minimizes a probability of $NH_3$ slip when the temperature of the SCR catalyst transitions from the first temperature to a second temperature. The injector control module controls the amount of $NH_3$ stored in the SCR catalyst to maintain a second storage level when the second storage level maximizes the efficiency of the SCR catalyst relative to the first storage level and minimizes the probability of $NH_3$ slip relative to the first storage level.

16 Claims, 8 Drawing Sheets

AMMONIA STORAGE SET-POINT CONTROL FOR SELECTIVE CATALYTIC REDUCTION APPLICATIONS

CROSS-REFERENCE TO RELATED APPLICATIONS

This application claims the benefit of U.S. Provisional Application No. 61/224,653, filed on Jul. 10, 2009. The disclosure of the above application is incorporated herein by reference in its entirety.

FIELD

The present disclosure relates to emission control systems, and more particularly to controlling an ammonia storage level in a selective catalytic reduction system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines emit exhaust gas that includes carbon monoxide (CO), hydrocarbons (HC), and nitrogen oxides (NOx). An exhaust treatment system reduces the levels of CO, HC, and NOx in the exhaust gas. The exhaust treatment system may include an oxidation catalyst (OC) (e.g., a diesel OC), a particulate filter (PF) (e.g., a diesel PF), and a selective catalytic reduction (SCR) system. The OC oxidizes CO and HC to form carbon dioxide and water. The PF removes particulate matter from the exhaust gas. The SCR system reduces NOx.

The SCR system injects a reducing agent (e.g., urea) into the exhaust gas upstream from an SCR catalyst. The reducing agent forms ammonia that reacts with NOx in the SCR catalyst. The reaction of ammonia and NOx in the SCR catalyst reduces the NOx and results in the emission of diatomic nitrogen and water. When excess reducing agent is injected into the exhaust gas, the excess reducing agent may form excess ammonia that passes through the SCR catalyst without reacting.

SUMMARY

A system comprises an injector control module and an SCR optimization module. The injector control module controls an amount of ammonia ($NH_3$) stored in a selective catalytic reduction (SCR) catalyst to maintain a first storage level. The SCR optimization module determines whether the first storage level maximizes a conversion efficiency of the SCR catalyst at a first temperature and minimizes a probability of $NH_3$ slip when the temperature of the SCR catalyst transitions from the first temperature to a second temperature. The injector control module controls the amount of $NH_3$ stored in the SCR catalyst to maintain a second storage level when the second storage level maximizes the efficiency of the SCR catalyst relative to the first storage level and minimizes the probability of $NH_3$ slip relative to the first storage level.

A method comprises controlling an amount of ammonia ($NH_3$) stored in a selective catalytic reduction (SCR) catalyst to maintain a first storage level. The method further comprises determining whether the first storage level maximizes a conversion efficiency of the SCR catalyst at a first temperature and minimizes a probability of $NH_3$ slip when the temperature of the SCR catalyst transitions from the first temperature to a second temperature. The method further comprises controlling the amount of $NH_3$ stored in the SCR catalyst to maintain a second storage level when the second storage level maximizes the efficiency of the SCR catalyst relative to the first storage level and minimizes the probability of $NH_3$ slip relative to the first storage level.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

A selective catalytic reduction (SCR) system reduces nitrogen oxides (NOx) in exhaust gas. The SCR system includes a reducing agent injector that injects a reducing agent into exhaust gas to form ammonia ($NH_3$). $NH_3$ may be released from the SCR system, for example, when the reducing agent injector injects excess reducing agent or when the temperature of the SCR system increases. Release of $NH_3$ from the SCR system may be referred to hereinafter as "$NH_3$ slip."

A storage level determination system according to the present disclosure determines an optimum $NH_3$ storage level for the SCR catalyst. The optimum $NH_3$ storage level may be a storage level that maximizes NOx conversion efficiency of the SCR catalyst while minimizing the probability of $NH_3$ slip due to transient operating conditions (e.g., a change in SCR temperature). The storage level determination system determines the optimum $NH_3$ storage level of the SCR catalyst using an SCR model. For example, the storage level determination system may determine whether an initial storage level is optimum based on modeling the effects of temperature and storage level perturbations on the initial storage level using the SCR model.

Figure 1:
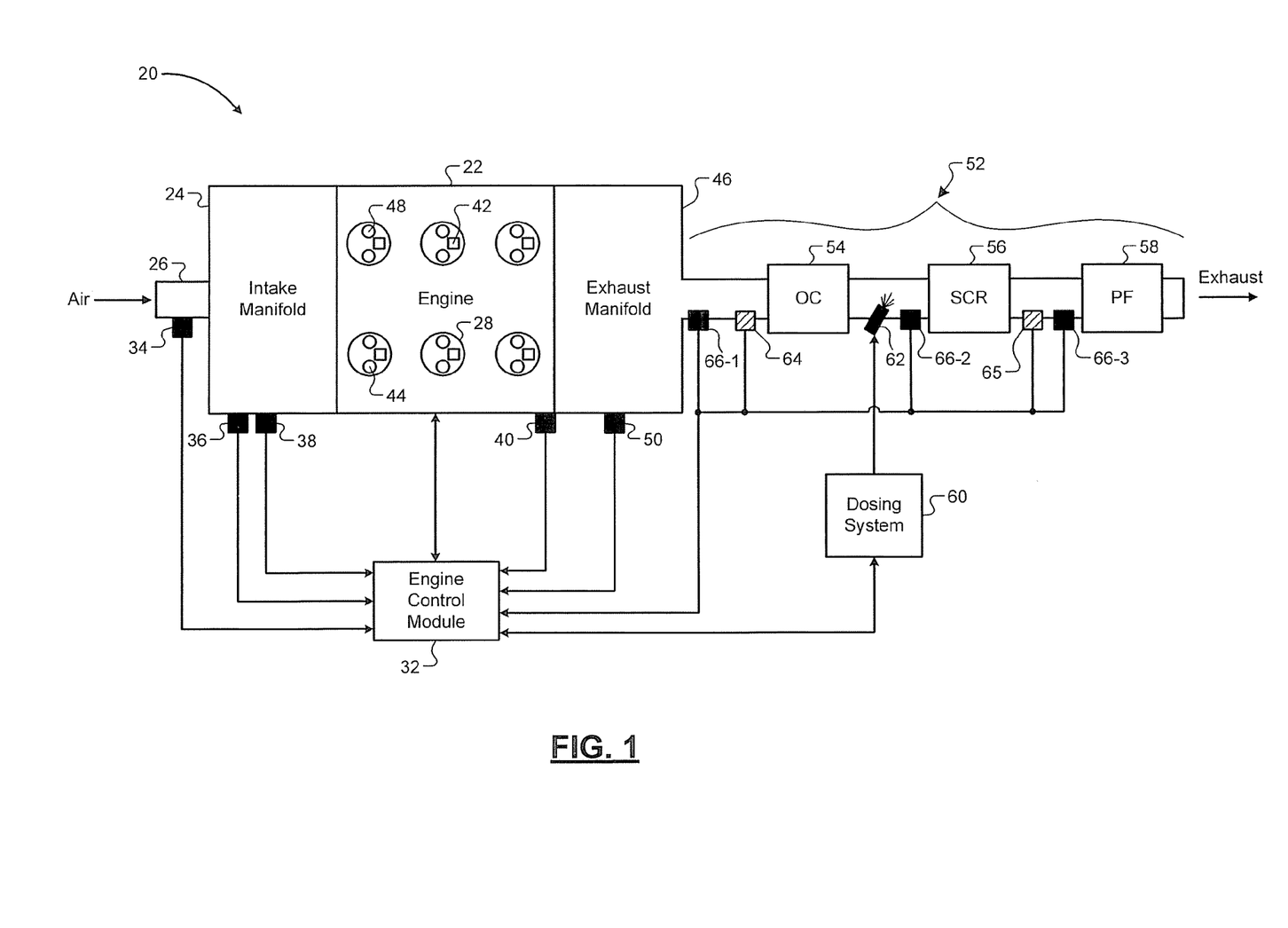
FIG. 1 is a functional block diagram of an engine system according to the present disclosure.

Referring now to FIG. 1, an engine system 20 (e.g., a diesel engine system) includes an engine 22 that combusts an air/fuel mixture to produce drive torque. Air is drawn into an intake manifold 24 through an inlet 26. A throttle (not shown) may be included to regulate air flow into the intake manifold 24. Air within the intake manifold 24 is distributed into cylinders 28. Although FIG. 1 depicts six cylinders 28, the engine 22 may include additional or fewer cylinders 28. Although a compression ignition engine is illustrated, a spark ignition engine is also contemplated.

The engine system 20 includes an engine control module (ECM) 32 that communicates with components of the engine system 20. The components may include the engine 22, sensors, and actuators as discussed herein. The ECM 32 may implement the storage level determination system of the present disclosure.

Air is passed from the inlet 26 through a mass airflow (MAF) sensor 34. The MAF sensor 34 generates a MAF signal that may indicate a mass of air flowing into the intake manifold 24. A manifold pressure (MAP) sensor 36 is positioned in the intake manifold 24 between the inlet 26 and the engine 22. The MAP sensor 36 generates a MAP signal that indicates air pressure in the intake manifold 24. An intake air temperature (IAT) sensor 38 located in the intake manifold 24 generates an IAT signal that indicates intake air temperature.

An engine crankshaft (not shown) rotates at engine speed or a rate that is proportional to engine speed. A crankshaft sensor 40 generates a crankshaft position (CSP) signal. The CSP signal may indicate the rotational speed and position of the crankshaft.

The ECM 32 actuates fuel injectors 42 to inject fuel into the cylinders 28. An intake valve 44 selectively opens and closes to enable air to enter the cylinder 28. An intake camshaft (not shown) regulates a position of the intake valve 44. A piston (not shown) compresses and combusts the air/fuel mixture within the cylinder 28. Alternatively, the air/fuel mixture may be ignited using a spark plug in a spark ignition engine. The piston drives the crankshaft during a power stroke to produce drive torque. Exhaust gas resulting from the combustion within the cylinder 28 is forced out through an exhaust manifold 46 when an exhaust valve 48 is in an open position. An exhaust camshaft (not shown) regulates a position of the exhaust valve 48. An exhaust manifold pressure (EMP) sensor 50 generates an EMP signal that indicates exhaust manifold pressure.

An exhaust treatment system 52 may treat the exhaust gas. The exhaust treatment system 52 may include an oxidation catalyst (OC) 54 (e.g., a diesel OC), an SCR catalyst 56 (hereinafter "SCR 56"), and a particulate filter (PF) 58 (e.g., a diesel PF). The OC 54 oxidizes carbon monoxide and hydrocarbons in the exhaust gas. The SCR 56 uses a reducing agent to reduce NOx in the exhaust gas. The PF 58 removes particulate matter in the exhaust gas.

The engine system 20 includes a dosing system 60. The dosing system 60 stores the reducing agent. For example, the reducing agent may include a urea/water solution. The ECM 32 actuates the dosing system 60 and a reducing agent injector 62 (hereinafter "injector 62") to control an amount of the reducing agent injected into the exhaust gas upstream of the SCR 56.

The reducing agent injected into the exhaust gas may form $NH_3$ when injected into the exhaust gas. Accordingly, the ECM 32 controls an amount of $NH_3$ supplied to the SCR 56. The SCR 56 adsorbs (i.e., stores) $NH_3$. The amount of $NH_3$ stored by the SCR 56 may be referred to hereinafter as an "$NH_3$ storage level." The ECM 32 may control the amount of $NH_3$ supplied to the SCR 56 to regulate the $NH_3$ storage level. $NH_3$ stored in the SCR 56 reacts with NOx in the exhaust gas passing through the SCR 56.

The exhaust treatment system 52 may include a first NOx sensor 64 and a second NOx sensor 65. Each NOx sensor 64, 65 generates a NOx signal that indicates an amount of NOx in the exhaust gas. The first NOx sensor 64 may be positioned upstream from the injector 62 and may indicate the amount of NOx entering the SCR 56. The signal generated by the first NOx sensor 64 may be called a $NOx_{in}$ signal. The second NOx sensor 65 may be positioned downstream from the SCR 56 and may indicate the amount of NOx exiting the SCR 56. The signal generated by the second NOx sensor 65 may be called a $NOx_{out}$ signal.

The percentage of NOx that is removed from the exhaust gas entering the SCR 56 may be referred to as a conversion efficiency of the SCR 56. The ECM 32 may determine the conversion efficiency of the SCR 56 based on the $NOx_{in}$ and $NOx_{out}$ signals. For example, the ECM 32 may determine the conversion efficiency of the SCR 56 based on the following equation:

$$\text{Efficiency}_{SCR} = \frac{NOx_{in} - NOx_{out}}{NOx_{in}} \quad \text{(Eq. 1)}$$

where $\text{Efficiency}_{SCR}$ represents the conversion efficiency of the SCR 56, and $NOx_{in}$ and $NOx_{out}$ represent the amount of NOx indicated by the $NOx_{in}$ and $NOx_{out}$ signals, respectively.

The conversion efficiency of the SCR 56 may be related to the amount of $NH_3$ stored in the SCR 56. Accordingly, the ECM 32 may control the amount of reducing agent injected into the exhaust gas to control the conversion efficiency of the SCR 56. Maintaining the $NH_3$ storage level of the SCR 56 near a maximum $NH_3$ storage level ensures that a maximum conversion efficiency is achieved. However, maintaining the $NH_3$ storage level at or near the maximum $NH_3$ storage level also increases the possibility of $NH_3$ slip. The second NOx sensor 65 is cross-sensitive to $NH_3$. Accordingly, the $NOx_{out}$ signal may indicate both the amount of NOx and the amount of $NH_3$ in the exhaust gas flowing out of the SCR 56.

An increase in the temperature of the SCR 56 may cause $NH_3$ slip. For example, $NH_3$ may desorb from the SCR 56 when the temperature of the SCR 56 increases at times when the $NH_3$ storage level is near to the maximum $NH_3$ storage level. $NH_3$ slip may also occur due to an error (e.g., storage level estimation error) or faulty component (e.g., faulty injector) in the exhaust treatment system 52.

The engine system 20 may include exhaust temperature sensors 66-1, 66-2, and 66-3 (collectively exhaust temperature sensors 66). Each of the exhaust temperature sensors 66 generates exhaust temperature signals that indicate a temperature of the exhaust gas. The ECM 32 may determine the temperature of the SCR 56 based on the exhaust temperature signals. While three temperature sensors 66 are shown in FIG. 1, the engine system 20 may include more or less than three exhaust temperature sensors 66.

Figure 2:
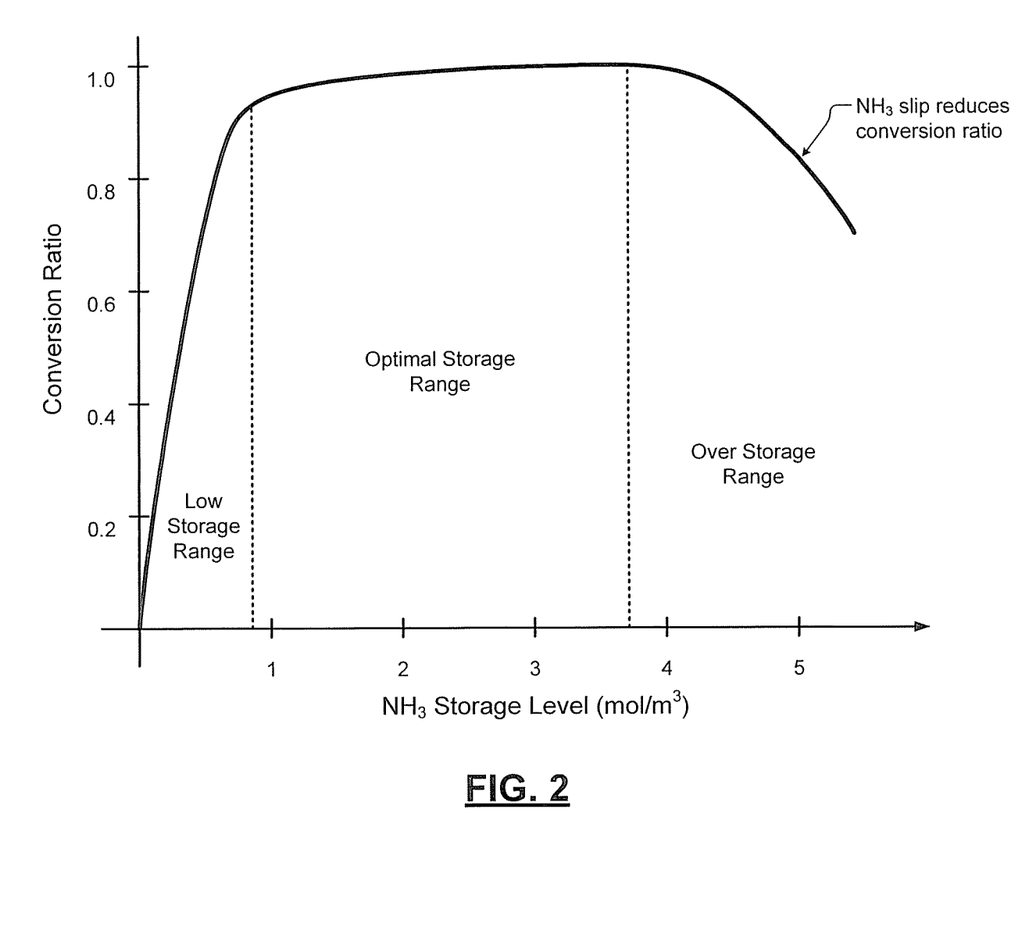
FIG. 2 is a graph that illustrates a selective catalytic reduction (SCR) system conversion ratio according to the present disclosure.

Referring now to FIG. 2, an exemplary relationship between a conversion ratio (η) of the SCR 56 and the $NH_3$ storage level of the SCR 56 is shown. The $NH_3$ storage level may be divided into three storage ranges: a low storage range, an optimal storage range, and an over storage range. The conversion ratio may be based on the $NOx_{in}$ and $NOx_{out}$ signals. For example, the conversion ratio may be expressed by the following equation:

$$\eta = \frac{NOx_{in} - NOx_{out} - NOx_{SLIP}}{NOx_{in}} \quad (Eq. 2)$$

where $NOx_{SLIP}$ represents a component of the $NOx_{out}$ signal due to $NH_3$ slip. Accordingly, the detection of $NH_3$ by the second NOx sensor 65 may decrease the conversion ratio.

The conversion ratio may represent conversion efficiency and/or an amount of $NH_3$ slip depending on the $NH_3$ storage level. The conversion ratio may represent the conversion efficiency of the SCR 56 when the $NH_3$ storage level is in the low storage range and the optimal storage range. For example, the conversion efficiency of the SCR 56 may be low (e.g., near zero) when the $NH_3$ storage level is low (e.g., near zero). The conversion efficiency, and accordingly the conversion ratio, of the SCR 56 may increase to a maximum of 1 as the $NH_3$ storage level increases towards the over storage range.

$NH_3$ slip may not occur in the low and optimal storage ranges because the injected $NH_3$ is adsorbed by the SCR 56 and/or reacts with NOx. Therefore, the $NOx_{out}$ signal primarily reflects NOx in the exhaust gas and little or no $NH_3$. As the $NH_3$ storage level increases from the low storage range to the optimal storage range, the $NOx_{out}$ signal decreases relative to the $NOx_{in}$ signal (i.e., the conversion efficiency increases).

When the $NH_3$ storage level increases into the over storage range, the conversion ratio may represent the amount of $NH_3$ slip. For example, the $NOx_{out}$ signal may increase in magnitude due to the detection of both $NH_3$ and NOx while the magnitude of the $NOx_{in}$ signal indicates only NOx. Accordingly, the increase in the magnitude of the $NOx_{out}$ signal may result in a decrease of the conversion ratio when the $NH_3$ storage level is in the over storage range.

Figure 3:
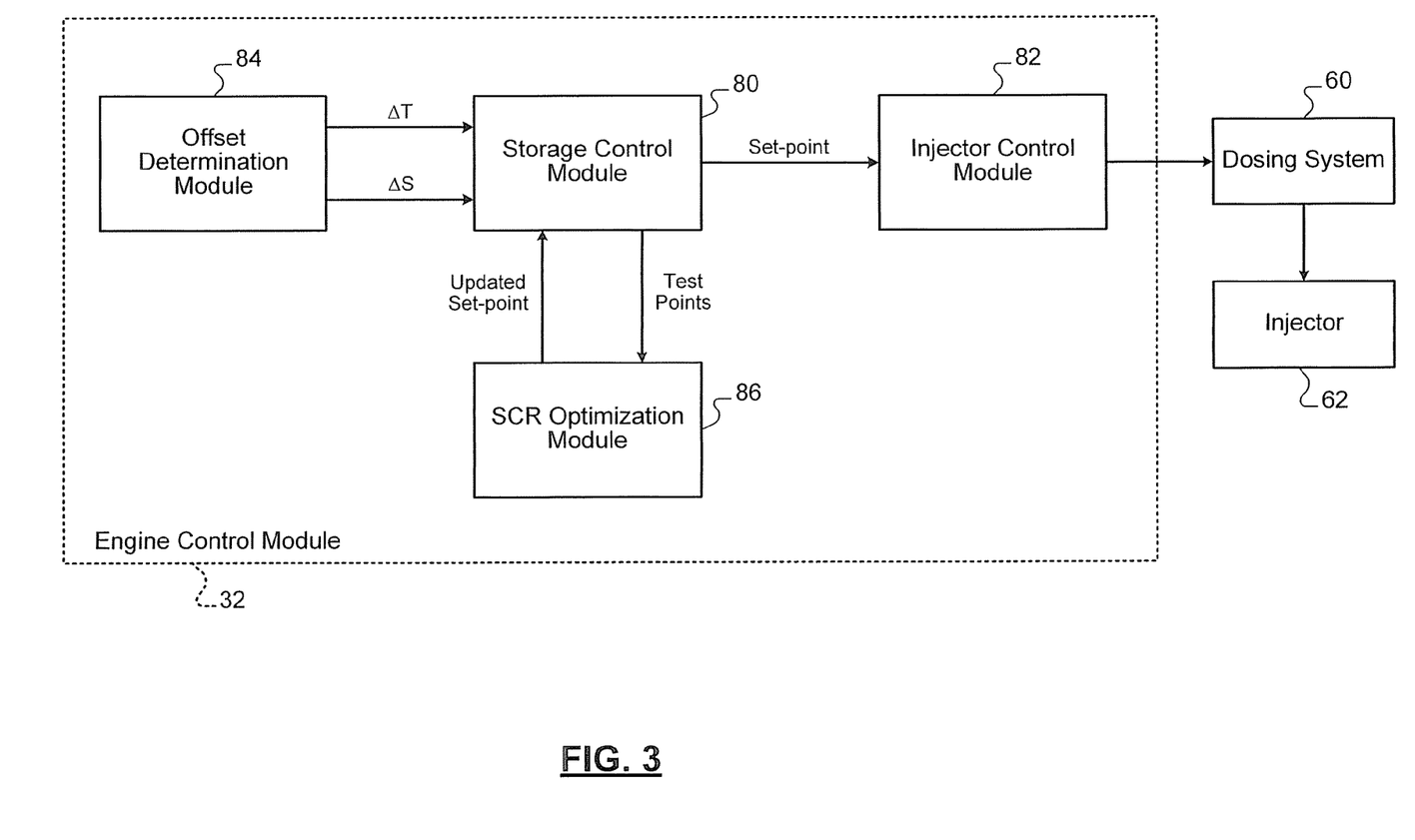
FIG. 3 is a functional block diagram of an engine control module according to the present disclosure.

Referring now to FIG. 3, the ECM 32 includes a storage control module 80, an injector control module 82, an offset determination module 84, and an SCR optimization module 86. The ECM 32 receives input signals from the engine system 20. The input signals include, but are not limited to, the MAF, MAP, IAT, CSP, EMP, exhaust temperature, and NOx signals. The ECM 32 processes the input signals and generates timed engine control commands that are output to the engine system 20. The engine control commands may actuate the fuel injectors 42, the dosing system 60, and the injector 62.

The storage control module 80 determines an $NH_3$ storage set-point (hereinafter "set-point") of the SCR 56 based on the SCR model. The set-point may indicate a target storage level for given operating conditions (e.g., a temperature of the SCR 56). Accordingly, the set-point may indicate a storage level (S) of the SCR 56 and a temperature (T) of the SCR 56. The set-point may be denoted as (S, T). The injector control module 82 controls the amount of reducing agent injected into the exhaust gas to adjust the storage level of the SCR 56 to the set-point. For example, the injector control module 82 may increase or decrease the storage level to reach the set-point when a new set-point is determined. Additionally, the injector control module 82 may increase or decrease the storage level to maintain the set-point when the set-point has been reached.

The offset determination module 84 determines an offset temperature (ΔT) and an offset storage amount (ΔS). The storage control module 80 determines a group of test points based on the set-point, the offset temperature and the offset storage amount. The group of test points may include perturbations of the set-point by ΔT and/or ΔS. For example, the group of test points may include (S,T+ΔT), (S−ΔS, T), (S−ΔS, T+ΔT), (S+ΔS, T), and (S+ΔS, T+ΔT).

The storage control module 80 may use the test points and the SCR model to model the effects of perturbing the temperature and the storage level of the SCR 56 to determine whether the set-point is at the optimum storage level. In other words, the storage control module 80 may use the test points to determine whether the set-point maximizes the conversion efficiency of the SCR 56 while minimizing the chance of $NH_3$ slip due to transient operating conditions.

The SCR optimization module 86 compares the set-point to the test points and determines whether the set-point is at the optimum storage level relative to the storage level of the test points (e.g., S−ΔS or S+ΔS). Accordingly, the storage control module 80 may update the set-point when one of the test points is at a more optimum storage level. In other words, the storage control module 80 may update the set-point to the test point that increases the efficiency of the SCR 56 and/or reduces the probability of $NH_3$ slip.

Figure 4:
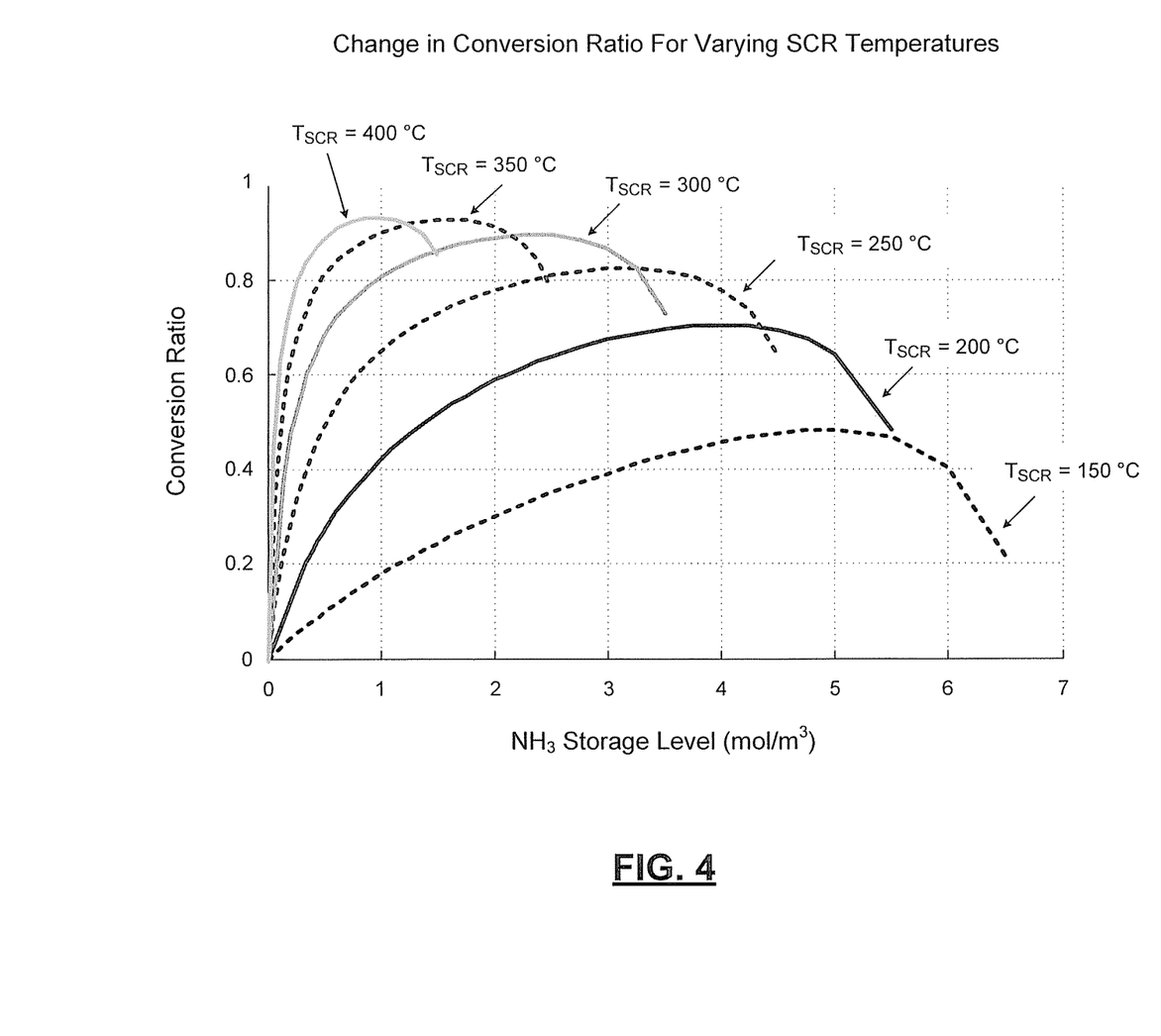
FIG. 4 is a graph that illustrates a change in the conversion ratio of an SCR catalyst for varying temperatures of the SCR catalyst according to the present disclosure.

Referring now to FIG. 4, the conversion ratio may depend on the temperature of the SCR 56. The temperature of the SCR 56 ranges from 150° C. to 400° C. in FIG. 4. The curves of FIG. 4 may represent exemplary output of the SCR model for a set of fixed operating conditions. For example, the set of fixed operating conditions may include, but are not limited to, an amount of NOx flowing into the SCR 56, a flow rate of the exhaust gas entering the SCR 56, and an amount of $NH_3$ entering the SCR 56. Accordingly, the SCR model, and more specifically the conversion ratio, may be based on more parameters than the storage level and temperature of the SCR 56.

$NH_3$ slip may occur at lower storage levels as the temperature of the SCR 56 increases. Accordingly, the optimum storage level may shift to a lower storage level when the temperature of the SCR 56 increases. The storage control module 80 may therefore decrease the storage level to decrease the chance of $NH_3$ slip and maintain the conversion efficiency of the SCR 56 when the temperature of the SCR 56 increases.

Figure 5:
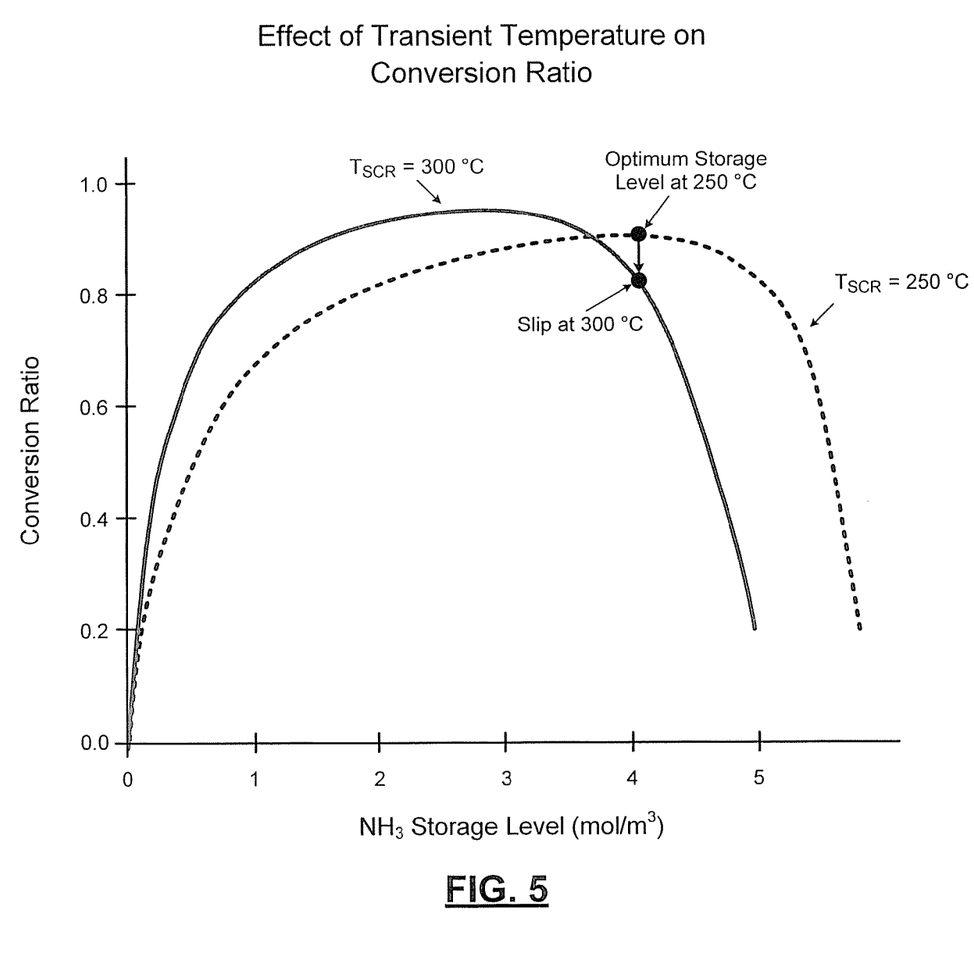
FIG. 5 is a graph that illustrates a change in the optimum storage level of the SCR catalyst when the temperature of the SCR catalyst changes from 250° C. to 300° C. according to the present disclosure.

Referring now to FIG. 5, the graph illustrates that the optimum storage level may shift when the temperature of the SCR 56 changes. Specifically, the graph illustrates that an optimum storage level at 250° C. may not be an optimum storage level at 300° C. since the increase in temperature from 250° C. to 300° C. may result in NH3 slip.

The storage control module 80 may determine an initial set-point based on initial operating conditions. For example only, the initial operating conditions may include steady state operating conditions, for example, the temperature of the SCR 56 may be constant. Accordingly, the storage control module 80 may determine the initial set-point based on a constant SCR temperature. When the SCR 56 is operating at steady state operating conditions with no temperature perturbations, the SCR 56 may operate at a peak of the conversion ratio curve, thereby maximizing NOx conversion efficiency without $NH_3$ slip. Operation of the SCR 56 at the peak of the conversion ratio curve is illustrated in FIG. 5 at 250° C. However, during transient operating conditions (e.g., temperature changes), the SCR 56 may slip $NH_3$ if the injector control module 82 controls injection of the reducing agent based on the initial set-point. $NH_3$ slip due to transient operating conditions is illustrated in FIG. 5 when the temperature of the SCR 56 transitions from 250° C. to 300° C. Therefore, the storage control module 80 may update the set-point to prevent $NH_3$ slip due to transient temperature changes.

The storage control module 80 may determine the set-point of the SCR 56 based on the SCR model. The SCR model may be based on multiple operating conditions that affect the conversion efficiency and/or $NH_3$ slip performance of the SCR 56. The SCR model may be based on an amount of NOx flowing into the SCR 56, the temperature of exhaust gas entering the SCR 56, a flow rate of the exhaust gas entering the SCR 56, an exhaust pressure upstream of the SCR 56, an $NO_2$ ratio, an amount of $NH_3$ entering the SCR 56, an oxygen concentration of the exhaust gas, and a prior $NH_3$ storage level of the SCR 56.

The SCR model may be based on the amount of NOx flowing into the SCR 56. Accordingly, the storage control module 80 may determine the set-point based on the amount of NOx flowing into the SCR 56. For example, the storage control module 80 may determine the amount of NOx flowing into the SCR 56 based on the $NOx_{in}$ signal.

The SCR model may be based on the temperature of exhaust gas entering the SCR 56. Accordingly, the storage control module 80 may determine the set-point based on the temperature of the exhaust gas entering the SCR 56. For example, the storage control module 80 may determine the temperature of the exhaust gas entering the SCR 56 based on signals from one of the exhaust temperature sensors 66 upstream from the SCR 56. Additionally, the storage control module 80 may use the SCR model to model the temperature of exhaust gas entering the SCR 56. For example, the SCR model may model heat loss in the exhaust treatment system 52.

The SCR model may be based on the flow rate of the exhaust gas entering the SCR 56. Accordingly, the storage control module 80 may determine the set-point based on the flow rate of the exhaust gas entering the SCR 56. For example, the storage control module 80 may determine the flow rate of the exhaust gas based on MAF signals and an amount of fuel injected into the cylinders 28.

The SCR model may be based on the exhaust pressure upstream of the SCR 56. Accordingly, the storage control module 80 may determine the set-point based on the exhaust pressure upstream of the SCR 56. For example, the storage control module 80 may determine the exhaust pressure based on EMP signals.

The SCR model may be based on an $NO_2$ ratio. Accordingly, the storage control module 80 may determine the set-point based on the $NO_2$ ratio. The $NO_2$ ratio may be a ratio of the amount of $NO_2$ in the exhaust gas to a total amount of NOx in the exhaust gas.

The SCR model may be based on the amount of $NH_3$ entering the SCR 56. Accordingly, the storage control module 80 may determine the set-point based on the amount of $NH_3$ entering the SCR 56. For example, the storage control module 80 may determine the amount of $NH_3$ entering the SCR 56 based on an amount of reducing agent injected from the injector 62.

The SCR model may be based on oxygen concentration of the exhaust gas. Accordingly, the storage control module 80 may determine the set-point based on the oxygen concentration of the exhaust gas. For example, the storage control module 80 may determine the oxygen concentration of the exhaust gas based on an oxygen sensor (not shown) in the exhaust treatment system 52.

Additionally, the SCR model may be based on a prior $NH_3$ storage level. Accordingly, the storage control module 80 may determine the set-point based on the prior $NH_3$ storage level. Therefore, the SCR model may determine the optimum storage level based on feedback of the prior $NH_3$ storage level.

The storage control module 80 may use the SCR model to determine the conversion efficiency and the probability of $NH_3$ slip at the set-point relative to the test points. In some implementations, the storage control module 80 may use the same SCR model to both control the storage level of the SCR 56 and to predict the effect of $\Delta T$ and $\Delta S$ on the SCR 56.

The injector control module 82 controls the storage level of the SCR 56 based on the set-point. For example, the injector control module 82 may actuate the injector 62 to increase injection of the reducing agent to increase the storage level of the SCR 56 to the set-point when the storage level is less than the set-point. Alternatively, the injector control module 82 may reduce injection to allow for a reduced storage level when the set-point is less than the storage level of the SCR 56. Accordingly, the injector control module 82 controls the injector 62 to reach the set-point.

The offset determination module 84 determines $\Delta T$ and $\Delta S$. $\Delta T$ may represent an increase in the temperature of the exhaust gas above a current operating temperature. The offset determination module 84 may determine $\Delta T$ based on a potential increase in the temperature of the exhaust gas and/or an increase in the flow rate of the exhaust gas. For example, $\Delta T$ may be 50° C. Accordingly, the temperature of the SCR 56 may change from 250° C. to 300° C. due to a change in the temperature of the exhaust gas and/or the increase in the flow rate of the exhaust gas. The storage control module 80 may determine the effect of the increase in exhaust gas temperature on the conversion efficiency and probability of $NH_3$ slip of the SCR 56.

$\Delta S$ may represent a change in the storage level from the current storage level. For example, $\Delta S$ may represent a change in storage level relative to the storage level of the set-point. The storage control module 80 may determine the effect of the change in storage level on the conversion efficiency and probability of $NH_3$ slip of the SCR 56.

Figure 6:
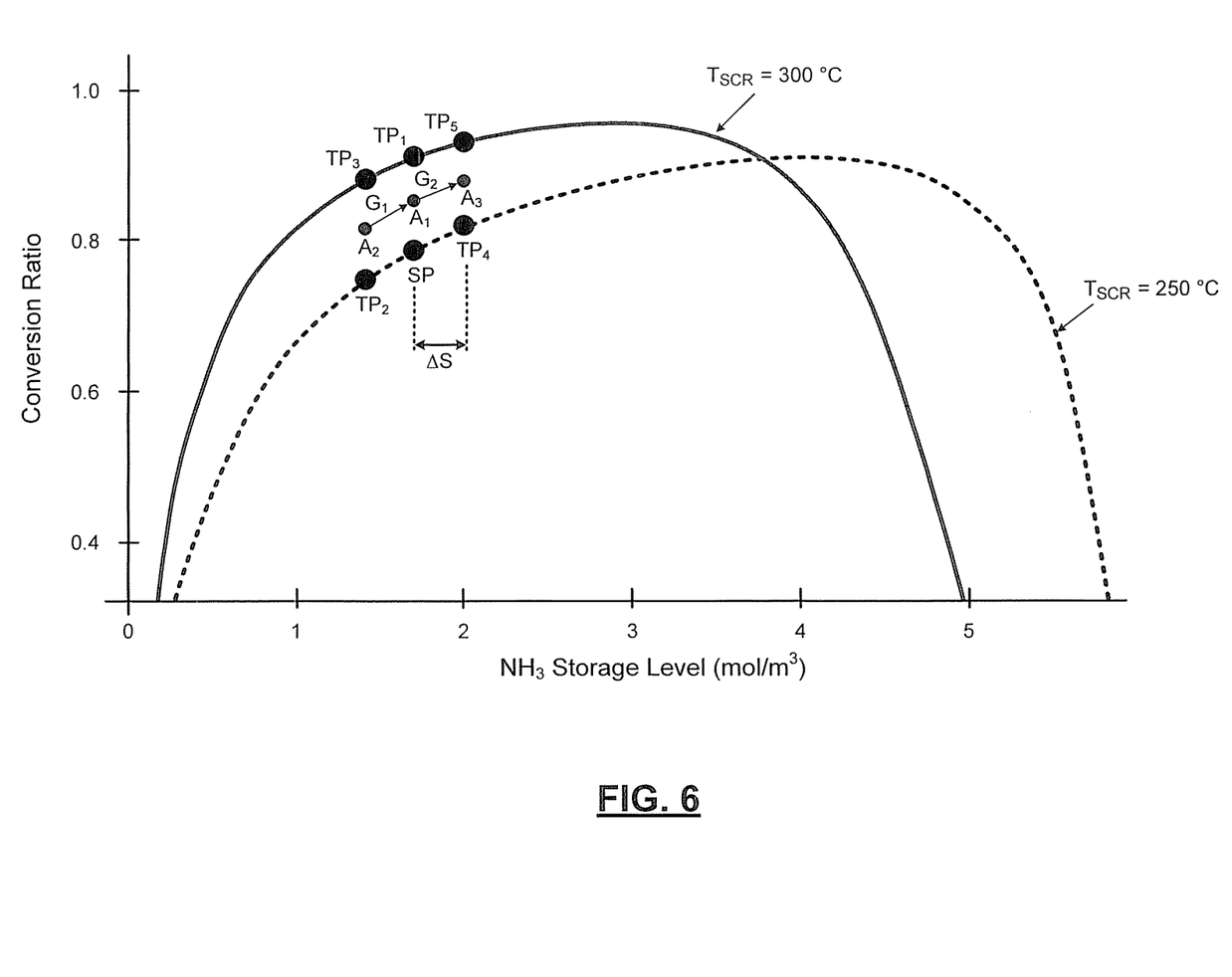
FIG. 6 is graph that illustrates determining an optimum set-point ($TP_4$) based on a current set-point (SP) and a group of test points ($TP_1$-$TP_5$) according to the present disclosure.

Referring now to FIG. 6, the storage control module 80 may determine test points ($TP_1$-$TP_5$) that each correspond to the set-point (SP) perturbed by $\Delta T$ and/or $\Delta S$. The set-point SP may be at a temperature (T) and a storage level (S). T and $\Delta T$ in FIG. 6 are 250° C. and 50° C., respectively.

The storage control module 80 may determine the test points after the injector control module 82 controls the injector 62 to reach the set-point. For example, the injector control module 82 may be controlling the storage level of the SCR 56 based on the set-point when the storage control module 80 is determining $TP_1$-$TP_5$. Accordingly, the storage control module 80 may determine the set-point using the SCR model, then determine the test points using the SCR model while the injector control module is controlling the storage level of the SCR 56 based on the set-point.

The storage control module 80 may determine a first test point ($TP_1$) based on SP and $\Delta T$. For example, $TP_1$ may be at a storage level of S and an increased temperature equal to $T+\Delta T$. The storage control module 80 may determine a second test point ($TP_2$) based on SP and $\Delta S$. For example, $TP_2$ may be at the temperature T and a storage level of $S-\Delta S$.

The storage control module 80 may determine a third test point ($TP_3$) based on SP, $\Delta T$, and $\Delta S$. For example, $TP_3$ may be at a storage level of $S-\Delta S$ and a temperature of $T+\Delta T$. The storage control module 80 may determine a fourth test point ($TP_4$) based on SP and $\Delta S$. For example, $TP_4$ may be at a storage level of S+ΔS and the temperature T. The storage control module 80 may determine a fifth test point $TP_5$ based on SP, ΔT, and ΔS. For example, $TP_5$ may be at a storage level of S+ΔS and the temperature T+ΔT.

The SCR optimization module 86 may determine averages of the conversion ratio at each of the storage levels S, S+ΔS, and S−ΔS. For example, the SCR optimization module 86 may determine an average ($A_1$) that is equal to the average of the conversion ratios at SP and $TP_1$. The SCR optimization module 86 may determine an average ($A_2$) that is equal to the average of the conversion ratios at $TP_2$ and $TP_3$. The SCR optimization module 86 may determine an average ($A_3$) that is equal to the average of the conversion ratios at $TP_4$ and $TP_5$.

The SCR optimization module 86 may determine a gradient ($G_1$) from $A_2$ to $A_1$. The SCR optimization module 86 may determine a gradient ($G_2$) from $A_1$ to A3. The SCR optimization module 86 may determine whether the set-point SP is an optimum set-point based on gradients $G_1$ and $G_2$.

The SCR optimization module 86 may determine whether the set-point is at an optimum storage level based on a direction of the gradients $G_1$ and $G_2$. A positive gradient $G_2$ from $A_1$ to $A_3$ may indicate that changing the storage level from S to S+ΔS may increase the conversion efficiency of the SCR 56. Additionally, the positive gradient from $A_1$ to $A_3$ may indicate that changing the storage level from S to S−ΔS may not increase the probability of $NH_3$ slip due to a temperature increase of ΔT. Therefore, the SCR 56 may not be at the optimum storage level when the gradient $G_2$ is positive. Accordingly, the storage control module 80 may update the set-point to S+ΔS when the gradient $G_2$ is positive. In other words, the positive gradients $G_1$ and $G_2$ in FIG. 6 may indicate that changing the storage level from S to S+ΔS may increase the efficiency of the SCR 56 and not increase the probability of $NH_3$ slip due to a temperature increase of ΔT.

Figure 7:
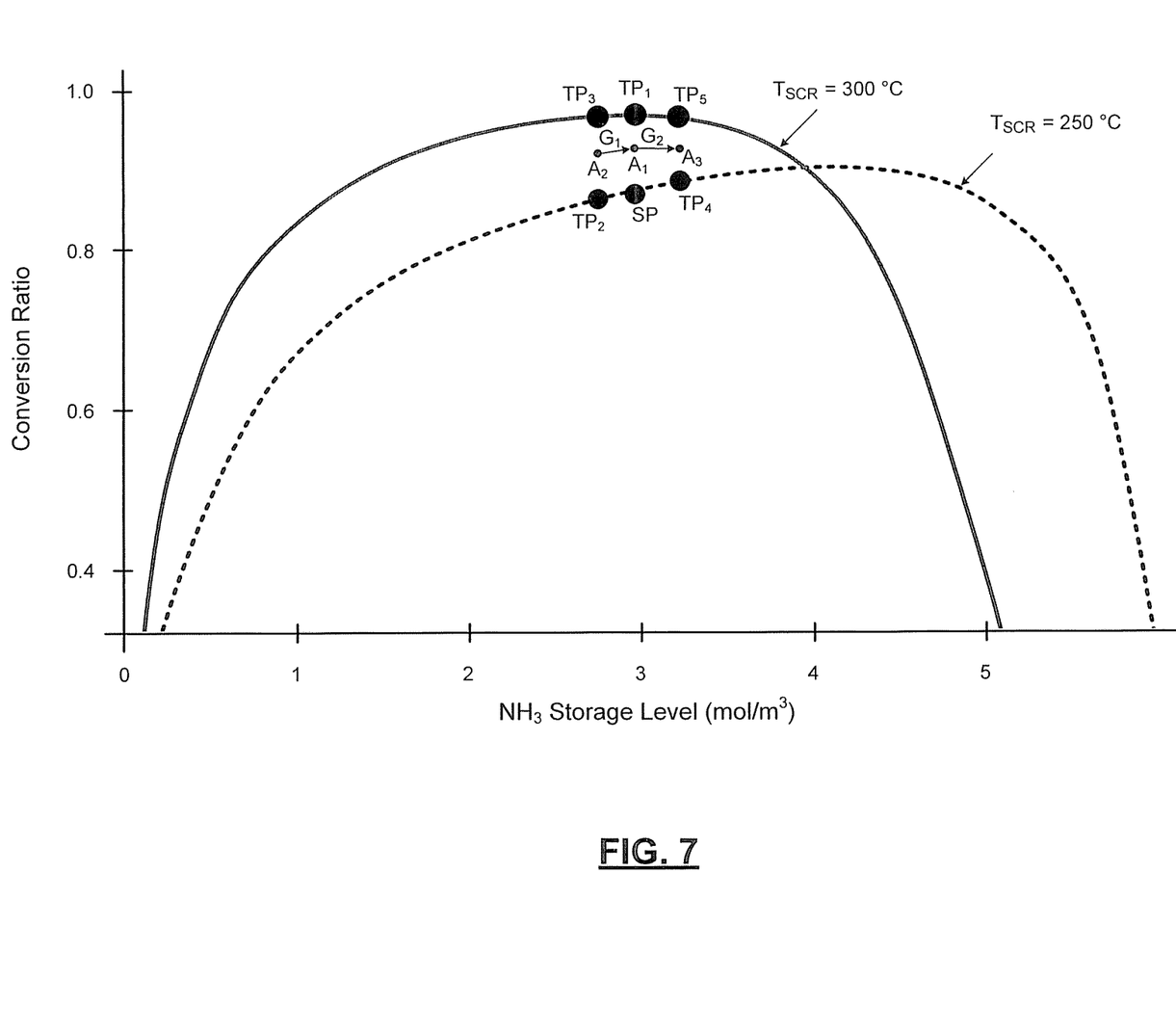
FIG. 7 is a graph that illustrates determining the optimum set-point (SP) based on the current set-point (SP) and a group of test points ($TP_1$-$TP_5$) according to the present disclosure.

Referring now to FIG. 7, a negative gradient from $A_1$ to $A_3$ may indicate that changing the storage level from S to S+ΔS may decrease the conversion efficiency of the SCR 56. Additionally, the negative gradient from $A_1$ to $A_3$ may indicate that changing the storage level from S to S+ΔS may increase the probability of $NH_3$ slip due to a temperature increase of ΔT. Therefore, the SCR 56 may be at the optimum storage level when the gradient from $A_1$ to $A_3$ is negative.

The gradient $G_1$ is near zero, or slightly positive. The near zero gradient from $A_2$ to $A_1$ and the negative gradient from $A_1$ to $A_3$ may indicate that the set-point SP may be near the optimum storage level. In other words, increasing the storage level may increase the probability of $NH_3$ slip, and decreasing the storage level may not improve conversion efficiency of the SCR 56. Accordingly, the storage control module 80 may not update the storage level from S to S+ΔS or S−ΔS when the gradient $G_1$ is slightly positive and the gradient $G_2$ is negative.

Figure 8:
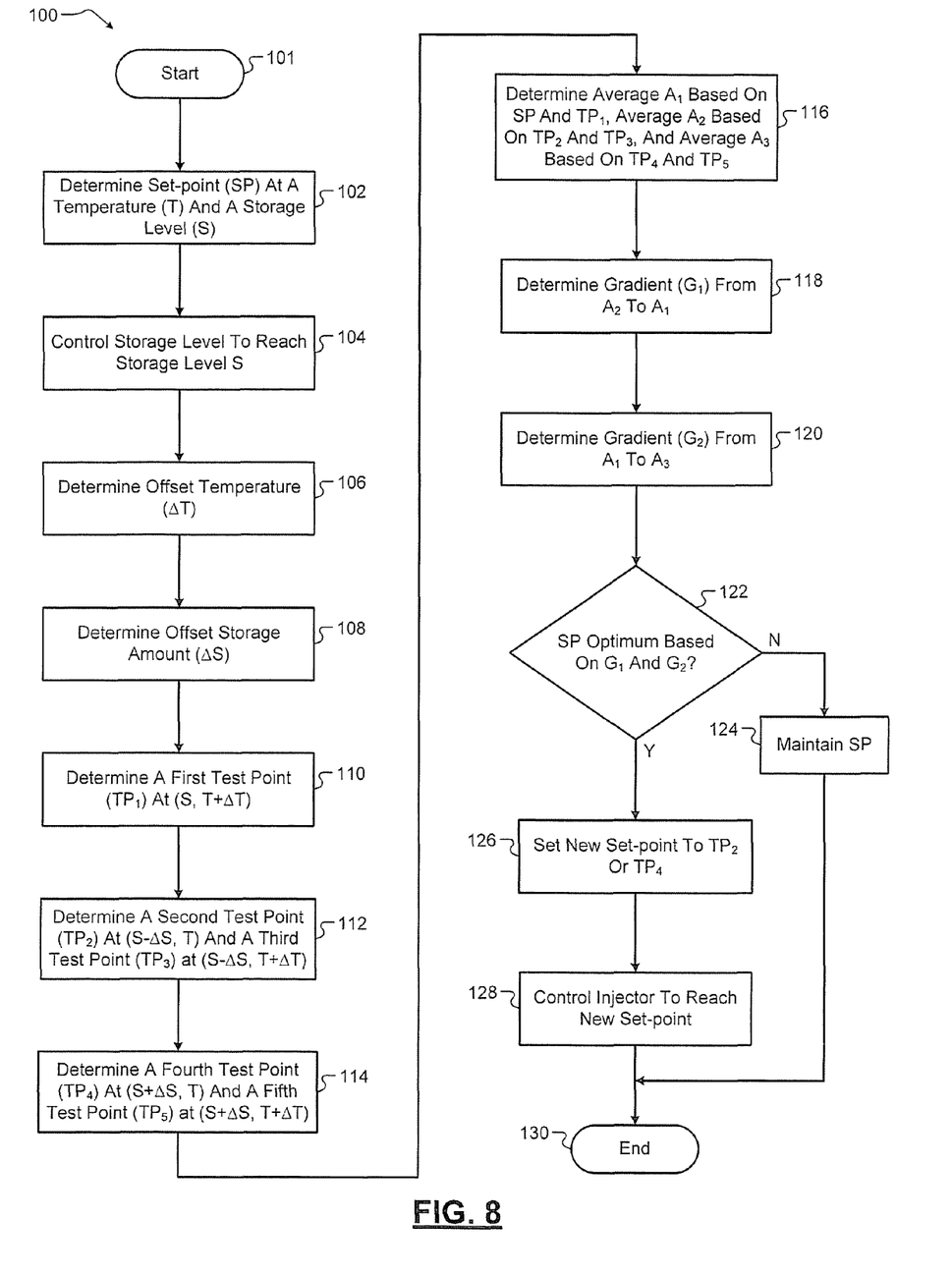
FIG. 8 is a flow diagram that illustrates the steps of a method for determining an optimum storage level according to the present disclosure.

Referring now to FIG. 8, a method 100 for determining an optimum storage level starts in step 101. In step 102, the storage control module 80 determines the set-point at a temperature (T) and a storage level (S). In step 104, the injector control module 82 controls the injector 62 to reach the storage level S. In step 106, the offset determination module 84 determines the offset temperature (ΔT). In step 108, the offset determination module 84 determines the offset storage amount (ΔS).

In step 110, the storage control module 80 determines the first test point ($TP_1$) at (S, T+ΔT). In step 112, the storage control module 80 determines the second test point ($TP_2$) at (S−ΔS, T) and the third test point ($TP_3$) at (S−ΔS, T+ΔT). In step 114, the storage control module 80 determines the fourth test point ($TP_4$) at (S+ΔS, T) and the fifth test point ($TP_5$) at (S+ΔS, T+ΔT).

In step 116, the SCR optimization module 86 determines the average $A_1$ based on the set-point and $TP_1$, determines the average $A_2$ based on $TP_2$ and $TP_3$, and determines the average $A_3$ based on $TP_4$ and $TP_5$. In step 118, the SCR optimization module 86 determines the gradient ($G_1$) from $A_2$ to $A_1$. In step 120, the SCR optimization module 86 determines the gradient ($G_2$) from $A_1$ to $A_3$.

In step 122, the SCR optimization module 86 determines whether the set-point is at the optimum storage level based on $G_1$ and $G_2$. If the result of step 122 is false, the method 100 continues with step 124. If the result of step 122 is true, the method 100 continues with step 126. In step 124, the injector control module 82 maintains the storage level at the set-point. In step 126, the storage control module 80 sets the new set-point to $TP_2$ or $TP_4$. In step 128, the injector control module 82 controls the injector 62 to reach the new set-point. The method 100 ends in step 130.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
an injector control module that controls an amount of ammonia ($NH_3$) stored in a selective catalytic reduction (SCR) catalyst to maintain a first storage level; and
an SCR optimization module that predicts whether a second storage level maximizes a conversion efficiency of the SCR catalyst and minimizes a probability of $NH_3$ slip when the temperature of the SCR catalyst transitions from a current temperature to a potential temperature,
wherein the injector control module increases an amount of reducing agent injected into exhaust gas to adjust the amount of $NH_3$ stored in the SCR catalyst from the first storage level to the second storage level at a current time when the second storage level is predicted to maximize the efficiency of the SCR catalyst relative to the first storage level and minimize the probability of $NH_3$ slip relative to the first storage level at a future time when the SCR catalyst is at the potential temperature.

2. The system of claim 1 wherein the injector control module controls the amount of $NH_3$ stored in the SCR catalyst to maintain the first storage level when the first storage level maximizes the efficiency of the SCR catalyst relative to the second storage level and minimizes the probability of $NH_3$ slip relative to the second storage level.

3. The system of claim 1 wherein the first storage level corresponds to a greater amount of $NH_3$ stored in the SCR catalyst than the second storage level.

4. The system of claim 1 wherein the second storage level corresponds to a greater amount of $NH_3$ stored in the SCR catalyst than the first storage level.

5. The system of claim 4 wherein the injector control module controls the amount of $NH_3$ stored in the SCR catalyst to maintain a third storage level when the third storage level maximizes the efficiency of the SCR catalyst relative to the first and second storage levels and minimizes the probability of $NH_3$ slip relative to the first and second storage levels.

6. The system of claim 5 wherein the third storage level corresponds to a lesser amount of $NH_3$ stored in the SCR catalyst than the first and second storage levels.

7. The system of claim 1 wherein the SCR optimization module determines the efficiency of the SCR catalyst and the probability of $NH_3$ slip based on an SCR model.

8. The system of claim 7 wherein, when the injector control module is controlling the amount of $NH_3$ stored in the SCR catalyst to maintain the first storage level, the SCR optimization module determines the efficiency of the SCR catalyst at the second storage level and the probability of $NH_3$ slip at the second storage level based on the SCR model.

9. A method comprising:
controlling an amount of ammonia ($NH_3$) stored in a selective catalytic reduction (SCR) catalyst to maintain a first storage level;
predicting whether a second storage level maximizes a conversion efficiency of the SCR catalyst and minimizes a probability of $NH_3$ slip when the temperature of the SCR catalyst transitions from a current temperature to a potential temperature; and
increasing an amount of reducing agent injected into exhaust gas to adjust the amount of $NH_3$ stored in the SCR catalyst from the first storage level to the second storage level at a current time when the second storage level is predicted to maximize the efficiency of the SCR catalyst relative to the first storage level and minimize the probability of $NH_3$ slip relative to the first storage level at a future time when the SCR catalyst is at the potential temperature.

10. The method of claim 9 further comprising controlling the amount of $NH_3$ stored in the SCR catalyst to maintain the first storage level when the first storage level maximizes the efficiency of the SCR catalyst relative to the second storage level and minimizes the probability of $NH_3$ slip relative to the second storage level.

11. The method of claim 9 wherein the first storage level corresponds to a greater amount of $NH_3$ stored in the SCR catalyst than the second storage level.

12. The method of claim 9 wherein the second storage level corresponds to a greater amount of $NH_3$ stored in the SCR catalyst than the first storage level.

13. The method of claim 12 further comprising controlling the amount of $NH_3$ stored in the SCR catalyst to maintain a third storage level when the third storage level maximizes the efficiency of the SCR catalyst relative to the first and second storage levels and minimizes the probability of $NH_3$ slip relative to the first and second storage levels.

14. The method of claim 13 wherein the third storage level corresponds to a lesser amount of $NH_3$ stored in the SCR catalyst than the first and second storage levels.

15. The method of claim 9 further comprising determining the efficiency of the SCR catalyst and the probability of $NH_3$ slip based on an SCR model.

16. The method of claim 15 further comprising determining the efficiency of the SCR catalyst at the second storage level and the probability of $NH_3$ slip at the second storage level based on the SCR model when controlling the amount of $NH_3$ stored in the SCR catalyst to maintain the first storage level.

* * * * *

UNITED STATES PATENT AND TRADEMARK OFFICE
CERTIFICATE OF CORRECTION

PATENT NO. : 9,133,749 B2  
APPLICATION NO. : 12/579737  
DATED : September 15, 2015  
INVENTOR(S) : Kevin Andrew Gady et al.

It is certified that error appears in the above-identified patent and that said Letters Patent is hereby corrected as shown below:

Title Page, Item [73] Assignee, insert the following:

--GM Global Technology Operations LLC, Detroit, MI (US)--

Signed and Sealed this  
Fifth Day of July, 2016

Michelle K. Lee  
*Director of the United States Patent and Trademark Office*